United States Patent
Lee et al.

(10) Patent No.: US 12,502,539 B2
(45) Date of Patent: Dec. 23, 2025

(54) MEDICAL IMPLANTS AND ELECTRONICS AND ANTENNA ASSEMBLIES FOR USE WITH SAME

(71) Applicant: ADVANCED BIONICS AG, Staefa (CH)

(72) Inventors: Sung Jin Lee, Valencia, CA (US); Seth M. Pinsky, Valencia, CA (US); James George Elcoate Smith, Santa Clarita, CA (US)

(73) Assignee: Advanced Bionics AG, Staefa (CH)

( * ) Notice: Subject to any disclaimer, the term of this patent is extended or adjusted under 35 U.S.C. 154(b) by 402 days.

(21) Appl. No.: 17/909,155

(22) PCT Filed: Mar. 31, 2020

(86) PCT No.: PCT/US2020/025886
§ 371 (c)(1),
(2) Date: Sep. 2, 2022

(87) PCT Pub. No.: WO2021/201837
PCT Pub. Date: Oct. 7, 2021

(65) Prior Publication Data
US 2023/0091809 A1   Mar. 23, 2023

(51) Int. Cl.
*A61N 1/372* (2006.01)
*A61N 1/36* (2006.01)

(52) U.S. Cl.
CPC ..... *A61N 1/36038* (2017.08); *A61N 1/37229* (2013.01)

(58) Field of Classification Search
CPC .................. A61N 1/36038; A61N 1/37229
See application file for complete search history.

(56) References Cited

U.S. PATENT DOCUMENTS

| | | | |
|---|---|---|---|
| 5,824,022 A | 10/1998 | Zilberman et al. | |
| 6,850,803 B1* | 2/2005 | Jimenez | A61N 1/3787 607/36 |
| 8,811,643 B2 | 8/2014 | Crawford et al. | |
| 8,983,102 B2 | 3/2015 | Crawford et al. | |
| 9,616,241 B2* | 4/2017 | Deehr | A61N 1/3752 |
| 9,884,188 B2 | 2/2018 | Tourrel et al. | |
| 11,040,210 B2* | 6/2021 | Lim | H01Q 1/273 |
| 2003/0216793 A1* | 11/2003 | Karlsson | A61N 1/37229 607/60 |
| 2004/0215280 A1* | 10/2004 | Dublin | A61N 1/37229 607/36 |
| 2005/0075698 A1* | 4/2005 | Phillips | A61N 1/3787 607/61 |
| 2005/0113888 A1 | 5/2005 | Jimenez et al. | |

(Continued)

FOREIGN PATENT DOCUMENTS

EP  2853289 A1  4/2015
WO  WO 2018199936 A1  11/2018

OTHER PUBLICATIONS

PCT International Search and Written Opinion dated Dec. 1, 2020 for PCT App. Ser. No. PCT/US2020/025886.

(Continued)

*Primary Examiner* — Eric D. Bertram
(74) *Attorney, Agent, or Firm* — Henricks Slavin LLP (57) ABSTRACT

An electronics and antenna assembly is disclosed for use with a medical implant.

17 Claims, 7 Drawing Sheets

(56) References Cited

U.S. PATENT DOCUMENTS

| | | | |
|---|---|---|---|
| 2008/0021525 A1* | 1/2008 | Solzbacher | A61N 2/02 427/2.24 |
| 2010/0109958 A1* | 5/2010 | Haubrich | A61N 1/37229 343/718 |
| 2013/0131759 A1* | 5/2013 | Amely-Velez | A61N 1/37223 607/60 |
| 2013/0184797 A1 | 7/2013 | Tang et al. | |
| 2014/0262493 A1 | 9/2014 | Markham et al. | |
| 2015/0025613 A1 | 1/2015 | Nyberg et al. | |
| 2015/0136475 A1 | 5/2015 | Boutaud | |
| 2016/0005509 A1 | 1/2016 | Hafiz et al. | |
| 2016/0023006 A1* | 1/2016 | Ridler | A61N 1/36036 607/57 |
| 2018/0110985 A1 | 4/2018 | Walter et al. | |
| 2018/0221673 A1* | 8/2018 | Kuang | A61N 1/37229 |
| 2018/0296826 A1 | 10/2018 | Lee et al. | |
| 2018/0369586 A1 | 12/2018 | Lee et al. | |
| 2019/0009096 A1 | 1/2019 | Davis et al. | |
| 2019/0046797 A1 | 2/2019 | Calixto et al. | |
| 2019/0076649 A1 | 3/2019 | Lee et al. | |
| 2019/0255316 A1 | 8/2019 | Lee et al. | |
| 2019/0299014 A1* | 10/2019 | Lim | A61N 1/37229 |
| 2020/0139138 A1* | 5/2020 | Sit | H04B 5/79 |

OTHER PUBLICATIONS

Jorge Victoria Ahuir, *Going Wireless with Magnetic Shielding*, Würth Elektronik eiSos GmbH & Co. KG (Oct. 15, 2013).
Laird Technologies, Flexible Ferrite Sheets for NFC & Wireless Charging *Aug. 2014).

* cited by examiner

MEDICAL IMPLANTS AND ELECTRONICS AND ANTENNA ASSEMBLIES FOR USE WITH SAME

CROSS-REFERENCE TO RELATED APPLICATIONS

This application is the U.S. National Stage of PCT App. Ser. No. PCT/US2020/025886, filed Mar. 31, 2020.

BACKGROUND

1. Field

The present disclosure relates generally to transcutaneously powered medical implants.

2. Description of the Related Art

Inductive links are commonly used to transmit power and data to implanted medical devices such as, for example, prosthetic devices including cochlear implants and retinal implants, cardiac pacemakers, implantable defibrillators, recording devices, and neuromuscular stimulators. Many implanted devices include, among other things, various electronics located within a hermetically sealed electronics case and an antenna coil located to the side of to the electronics case and operably connected to the electronics within the case. An external antenna coil is positioned over the implanted antenna coil during use. Power and in some instances data is supplied to the implanted devices by way of the inductive link between the antenna coils.

Figure 1:
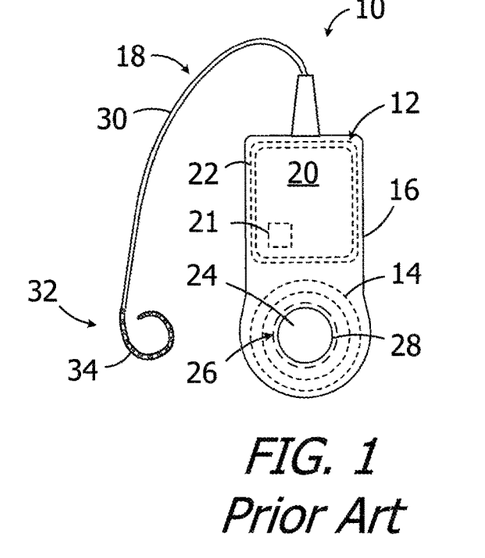
FIG. 1 is a top view of a conventional implantable cochlear stimulator.

Some implantable cochlear stimulation ("ICS") systems, for example, include an external sound processor and a cochlear implant with an electrode array. The electrode array may be positioned within the cochlea, or may be directly inserted into the cochlear nerve without residing in the cochlea. Referring to FIG. 1, an exemplary cochlear implant 10 includes a processor assembly 12 and an antenna coil (or "antenna") 14 within a flexible housing 16 formed from a silicone elastomer or other suitable material, as well as a cochlear lead 18 that extends outwardly from the flexible housing. The processor assembly 12 includes a printed circuit board ("PCB") 20 within a titanium case 22 that is operably connected to the antenna 14 and the cochlear lead 18. The antenna 14 receives data and power by way of an inductive link to the external antenna of a sound processor headpiece, and is spaced apart from the titanium case 22 in order to reduce the likelihood of efficiency reducing eddy currents being generated in the case material. Optimum communication is achieved when the implant antenna 14 and the headpiece antenna are aligned with one another and, to that end, the cochlear implant 10 includes a positioning magnet 24 that is attracted to a corresponding headpiece magnet to maintain the position of the headpiece antenna over the implant antenna. The magnet 24 may be located within a pocket 26 in the flexible housing 16 and may be removed, if necessary, by way of a magnet aperture 28. The cochlear lead 18 may include a flexible body 30, an electrode array 32 at one end of the flexible body, and a plurality of wires (not shown) that extend through the flexible body from the electrically conductive contacts 34 (e.g., platinum contacts) in the array 32 to the other end of the flexible body. A stimulation processor 21 on the PCB 20 converts stimulation data received by way of the antenna 14 into electrical stimulation current that is applied to varying electrode combinations in the electrode array 32 to create a perception of sound.

A representative ICS system is disclosed in U.S. Pat. No. 5,824,022, which is entitled "Cochlear Stimulation System Employing Behind-The-Ear Sound processor With Remote Control" and incorporated herein by reference in its entirety. Examples of commercially available ICS sound processors include, but are not limited to, the Advanced Bionics Harmony™ BTE sound processor, the Advanced Bionics Naida CI Q Series BTE sound processors and the Advanced Bionics Neptune™ body worn sound processor.

The present inventors have determined that conventional cochlear implants are susceptible to improvement. For example, the present inventors have determined that it would be desirable to reduce the size of cochlear implants.

SUMMARY

An electronics and antenna assembly for use in a medical implant includes a metal electronics case having an internal volume, an end wall and an external recess adjacent to the end wall, electronic components within the internal volume, an antenna within the external recess, an electromagnetic shield within the external recess between the antenna and the end wall. The present inventions also include implantable medical devices, such as cochlear implants, with such an electronics and antenna assembly.

An electronics and antenna assembly for use in a medical implant includes a metal electronics case including first and second end walls that face one another and define an internal volume therebetween, a magnet case within the electronics case and including a portion of the first end wall, a portion of the second end wall, and a cylindrical wall between the portions of the first and second end walls, electronic components within the internal volume and outside the magnet case, and at least one rotatable magnet within the magnet case.

A cochlear implant includes electronics and antenna assembly with an internal magnet case, an elastomer that covers at least a portion of the electronics and antenna assembly, and a cochlear lead connected to the electronics and antenna assembly. The electronics and antenna assembly and elastomer occupy a first volume, the magnet case includes an interior that defines a second volume, and the ratio of the first volume to the second volume is less than or equal to 9.7.

The above described and many other features of the present inventions will become apparent as the inventions become better understood by reference to the following detailed description when considered in conjunction with the accompanying drawings.

BRIEF DESCRIPTION OF THE DRAWINGS

Detailed descriptions of the exemplary embodiments will be made with reference to the accompanying drawings.

DETAILED DESCRIPTION OF THE EXEMPLARY EMBODIMENTS

The following is a detailed description of the best presently known modes of carrying out the inventions. This description is not to be taken in a limiting sense, but is made merely for the purpose of illustrating the general principles of the inventions.

The present inventions have application in a wide variety of systems including, but not limited to, those that provide sound (i.e., either sound or a perception of sound) to the hearing impaired. One example of such a system is an ICS system where an external sound processor communicates with a cochlear implant and, accordingly, the present inventions may be discussed in the context of cochlear implants. The present inventions are not, however, so limited, and have application in other systems where, for example, power and data are transmitted to an implanted medical device by way of an inductive link.

Figure 2:
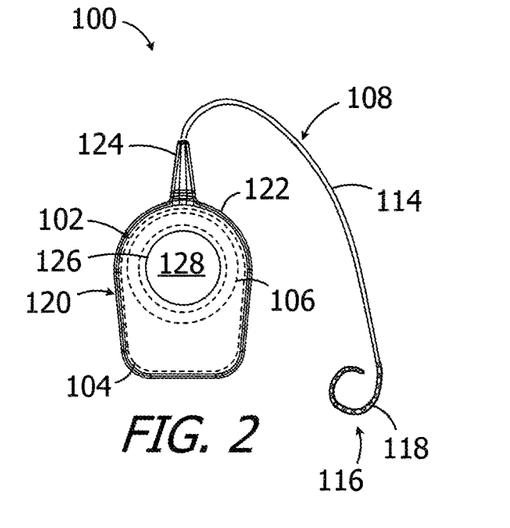
FIG. 2 is a top view of an exemplary implantable cochlear stimulator in accordance with one embodiment of a present invention.
Figure 3:
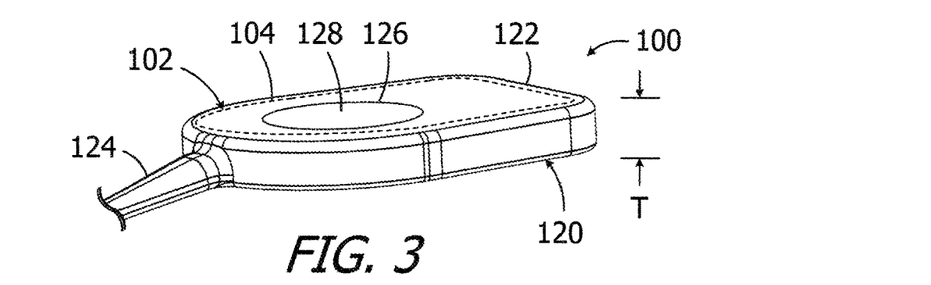
FIG. 3 is a perspective view of a portion of the implantable cochlear stimulator illustrated in FIG. 2.
Figure 4:
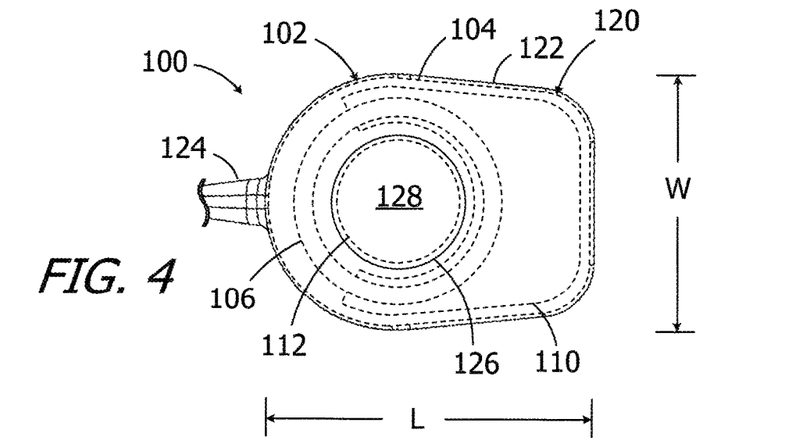
FIG. 4 is a top view of a portion of the implantable cochlear stimulator illustrated in FIG. 2.
Figures 5, 6, 7, 8:
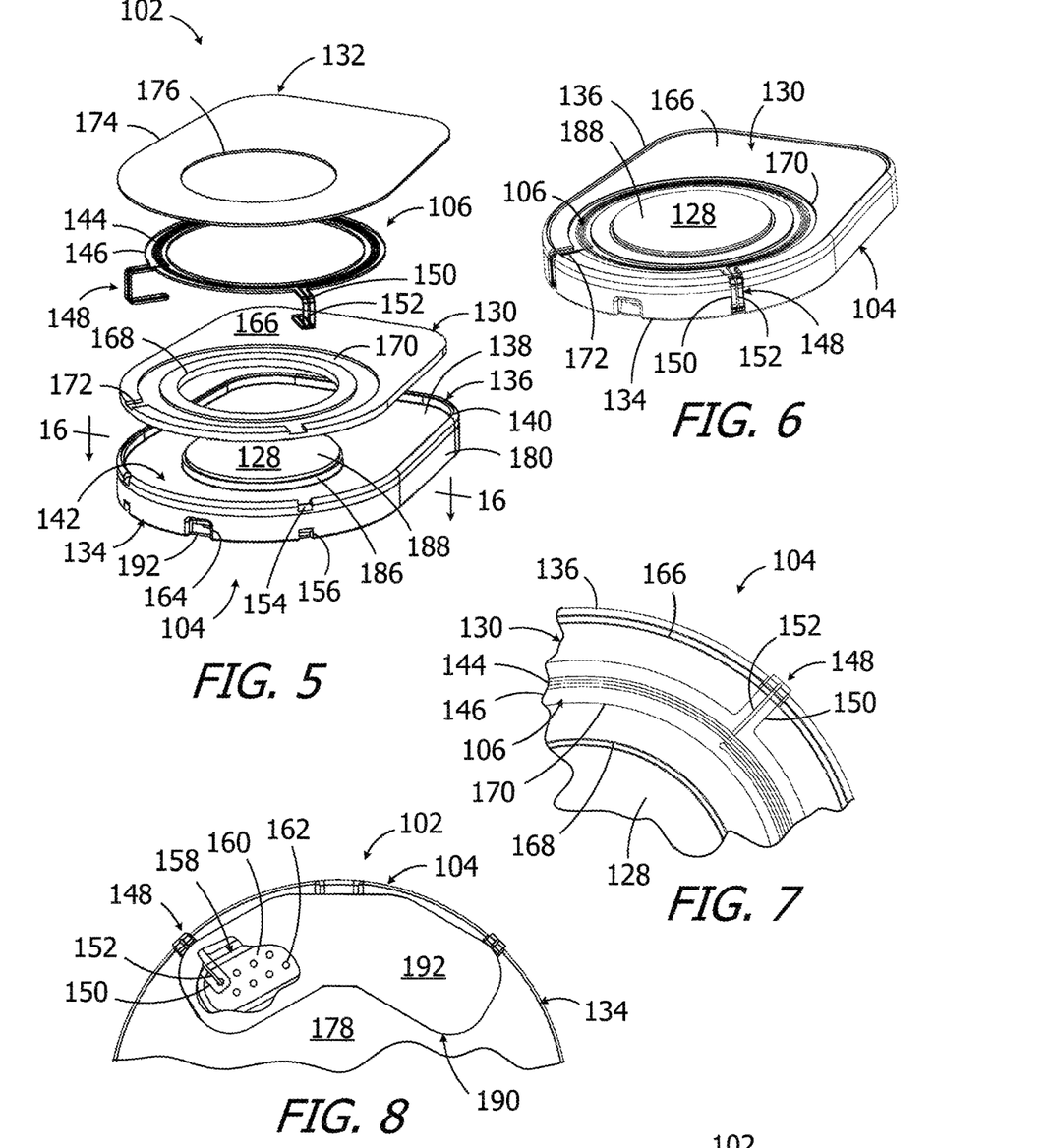
FIG. 5 is an exploded perspective view of an electronics and antenna assembly in accordance with one embodiment of a present invention.
FIG. 6 is a perspective view of a portion of the electronics and antenna assembly illustrated in FIG. 5.
FIG. 7 is a top view of a portion of the electronics and antenna assembly illustrated in FIG. 5.
FIG. 8 is a bottom cutaway view of a portion of the electronics and antenna assembly illustrated in FIG. 5.
Figure 11:
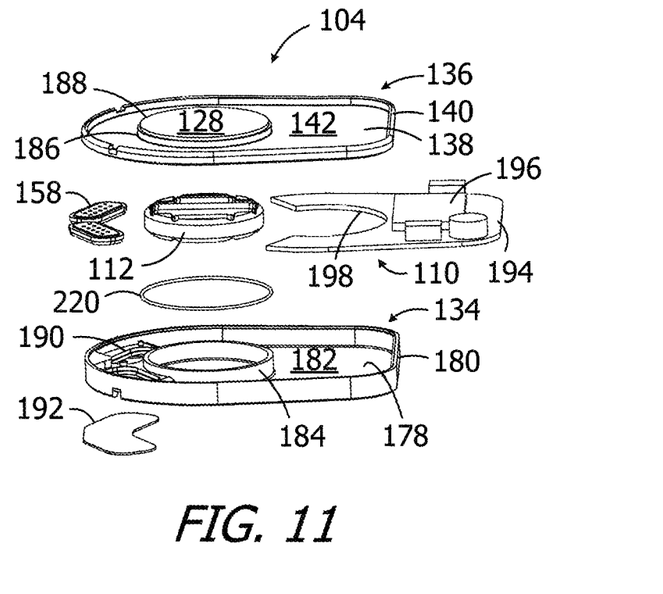
FIG. 11 is an exploded perspective view of a portion of the electronics and antenna assembly illustrated in FIG. 5.
Figure 12:
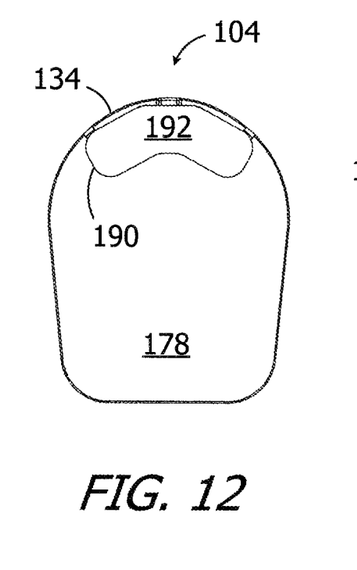
FIG. 12 is a bottom view of a portion of the electronics and antenna assembly illustrated in FIG. 5.
Figure 13:
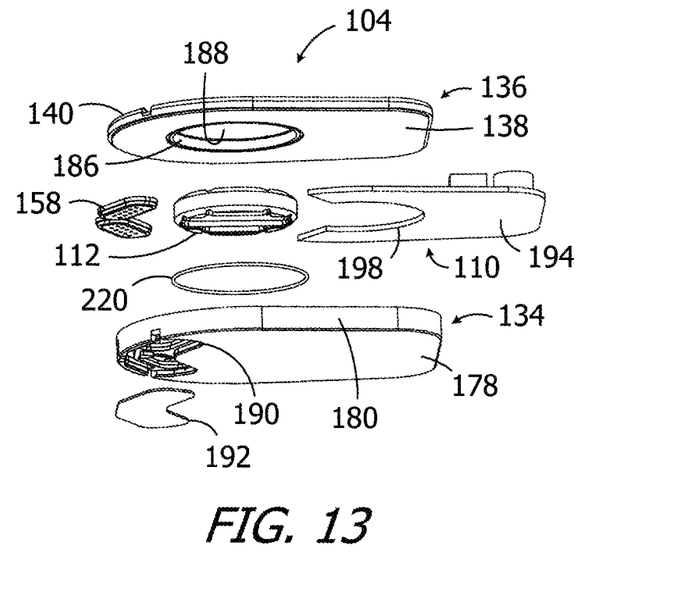
FIG. 13 is an exploded perspective view of a portion of the electronics and antenna assembly illustrated in FIG. 5.

One example of a cochlear implant (or "implantable cochlear stimulator") is the cochlear implant 100 illustrated in FIGS. 2-4. The cochlear implant 100 includes an electronics and antenna assembly ("EA assembly") 102, with an electronics case 104 and an antenna 106 mounted to the top of the electronics case, and a cochlear lead 108. The exemplary electronics case 104 (as well as electronics case 104 discussed below) may be formed from metals such as a titanium alloy (e.g., Ti-6Al-4V Grade 5), commercially pure titanium (Grade 2), or some other suitably strong biocompatible metal. A printed circuit board ("PCB") 110 with a stimulation processor 196 (FIG. 11) and various other electronic components may be located within the electronics case 104 and operably connected to the antenna 106 and cochlear lead 108. As is discussed in greater detail below, a magnetic resonance imaging ("MRI")-compatible magnet assembly 112 (FIG. 4) may have one or more rotatable magnets that are located within the electronics case 104 and, in at least some instances, portions of the electronics case 104 may form some or all of a case within the electronics case for the magnet assembly 112. The exemplary cochlear lead 108 has a flexible body 114, an electrode array 116 at one end of the flexible body, and a plurality of wires (not shown) that extend through the flexible body from the electrically conductive contacts 118 (e.g., platinum contacts) in the array 116 to the other end of the flexible body. The wires are operably connected to the PCB 110 in the manner described below with reference to FIG. 8. The top, bottom and sides of the EA assembly 102 may be covered with an overmold 120 (e.g., a silicone elastomer or other suitable material) that includes a case covering portion 122 and a strain relief 124. A portion of the electronics case 104 is exposed through an opening 126 in the overmold to define a ground contact 128. A grounding connection (not shown) is made between the electronics case 104 and the PCB 110.

Turning to FIGS. 5-8, the exemplary EA assembly 102 also includes electromagnetic shield 130 between the electronics case 104 and the antenna 106, as well as an antenna/shield cover 132 over the antenna and the electromagnetic shield. The electromagnetic shield 130 eliminates (or at least substantially reduces) efficiency-reducing eddy currents in the metal electronics case 104 during inductive communication between the antenna 106 and an external antenna, while the antenna/shield cover 132 protects the antenna 106 and the electromagnetic shield 130. The antenna/shield cover 132 also seals the antenna 106 and the electromagnetic shield 130 between the cover 132 and the outside of the electronics case 104.

There are a number of advantages associated with arrangement described above. By way of example, but not limitation, placement of the antenna 106 on the exterior of the electronics case 104 results in an implantable medical device (e.g., the cochlear implant illustrated in FIG. 2) that is more compact than one where the antenna is offset from the electronics case (e.g., the cochlear implant illustrated in FIG. 1). The present inventors have determined that one method of quantifying the compactness of an implantable medical device with a magnet assembly (or a magnet) is relationship between the volume occupied by the entire EA assembly and associated overmold (including the volume within the EA assembly occupied by the magnet assembly) and the volume occupied by the rotatable magnet assembly (or rotatable magnet). Referring to FIGS. 3 and 4, the exemplary EA assembly 102 and overmold 122, which together have a length L of 31.7 mm, a width W that varies and is 25.5 mm at the widest point and a thickness T of 3.9 mm, together occupy a volume 2.6 cm$^3$. Variations in the length L, width W and thickness T may result in volumetric variations of +/−0.6 cm$^3$. The volume occupied by the magnet assembly 112, which is the internal volume of the magnet case described below, is 0.33 cm$^3$. The ratio of the entire EA assembly and associated overmold volume to the magnet assembly volume in the illustrated implementation is less than or equal to 9.7. The ratio of the illustrated embodiment is 7.9. Although the ratio may be lower in other implementations, the low end of the present ratio range is 6.1.

The exemplary electronics case 104 includes a case base 134 and a case cover 136 that may be secured to one another to enclose the PCB 110 and the MRI-compatible magnet assembly 112, as is discussed below with reference to FIGS. 10-18. In particular, the case base 134 and case cover 136 may be secured to one another in such a manner that a hermetic seal is formed between the cover and the base. Suitable techniques include, for example, seam welding with a laser welder. The case cover 136 is configured to receive the electromagnetic shield 130, the antenna 106 and the antenna/shield cover 132. In particular, the case cover 136 includes an end wall 138 and a side wall 140 that together define an indentation (or "recess" or "external volume") 142 (FIG. 5) that is sized and shaped to receive the electromagnetic shield 130, the antenna 106 and the antenna/shield cover 132. A magnet apparatus case (discussed below with reference to FIGS. 16-18) is part of the electronics case 104 and a portion of the magnet apparatus case (i.e., the portion defined by the cylindrical member 186 and disc 188) extends upwardly from the end wall 138. The upper surface of the disc 188 defines the ground contact 128.

In the illustrated implementation, the antenna 106 (FIGS. 5-8) includes an electrically conductive antenna coil 144 on a thin electrically non-conductive substrate 146. The antenna coil 144 may, for example, be printed or otherwise formed on the surface of the substrate 146. Suitable conductive materials for the antenna coil 144 include gold and platinum, while suitable non-conductive materials for the substrate 146 include liquid crystal polymer ("LCP") and sealed polyimide. The substrate 146 is also annular in shape to accommodate the cylindrical member 186. A layer of non-conductive material (not shown) may also be formed over the antenna coil 144 and associated surface of the substrate 146. Exemplary antennas that include an antenna coil that is formed on substrate and are suitable for use in a medical implant are disclosed in U.S. Pat. Pub. No. 2015/0025613.

The exemplary antenna 106 is also provided with a pair of connector tabs 148 that each include an electrically non-conductive tab substrate 150 and a tab conductor 152 that is connected to a respective end of the antenna coil 144. The tab substrates 150, which may be integral with the annular substrate 146, extend outwardly from the annular substrate, past respective sets of openings 154 and 156 in the electronics case 104, and into the electronics case interior. The tab conductors 152 and, accordingly, the antenna coil 144 are connected to the PCB 110 by way of feedthroughs 158. The exemplary feedthrough 158 includes a ceramic insulator block 160 and a plurality of feedthrough pins 162 that extend through the insulator block. Exemplary feedthroughs are disclosed in US Pat. Pub. No. 2014/0262493. Each tab conductor 152 is connected to one end of a respective feedthrough pin 162, and the PCB 110 is connected to the other end. Other feedthrough pins 162 are connected to the lead wires (not shown) of the cochlear lead 108. An opening 164 is provided to allow passage of the lead wires into the electronics case 104. Two feedthroughs 158 are employed in the illustrated embodiment (note FIG. 11) and, during assembly, access to the feedthroughs is obtained by way of an opening 190 in the electronics case end wall 178 (discussed below). The opening 190 is closed with a cover 192 after the antenna and lead wire connections have been made, and the openings 154, 156 and 164 and cover 192 are covered by the overmold 120 (FIGS. 2-4).

The exemplary electromagnetic shield 130, which may be formed from a high magnetic permeability material, e.g. a soft ferrite such as nickel-zinc ferrite, includes a plate 166 that is configured (i.e., sized and shaped) to fit into the indentation 142 on the electronics case cover 136. In some implementations, the thickness of the soft ferrite sheet may range from about 0.1 mm to about 1.5 mm. As used herein, "about" means +/−10% and all values therebetween. The magnetic permeability ($\mu$) of a "high magnetic permeability material" ranges from about 25 to about 250. An opening 168 extends through the plate 166 to accommodate the cylindrical member 186. The electromagnetic shield 130 also includes an annular recess 170 for the antenna coil 144 and substrate 146 of the antenna 106. Openings 172, which are provided for the antenna tabs 148, are aligned with the openings 154 and 156. The high magnetic permeability electromagnetic shield 130 provides a conductive path for magnetic flux that directs the magnetic flux away from the metal electronics case 104, thereby reducing eddy currents and the associated efficiency losses.

The antenna/shield cover 132 in the exemplary implementation includes a plate 174 that is also configured to fit into the indentation 142 on the electronics case cover 136 and over the antenna 106 and the electromagnetic shield 130. An opening 176 extends through the plate 174 to accommodate cylindrical member 186. The antenna/shield cover 132, which protects antenna 106 and the electromagnetic shield 130 from impacts and seals the non-biocompatible electromagnetic shield within the EA assembly 102, may be formed from polyether ether ketone ("PEEK") or other suitable electrically non-conductive high-strength materials. In some instances, sealing material such as a biocompatible epoxy may be used in conjunction with the antenna/shield cover 132 to hermetically seal the electromagnetic shield 130 within the indentation 142. Alternatively, or in addition, the non-biocompatible electromagnetic shield 130 may be further isolated from the body by coating the electromagnetic shield with a biocompatible polymer such as PEEK, polyphenylsulfone ("PPSU"), or polytetrafluoroethylene ("PTFE").

Figure 9:
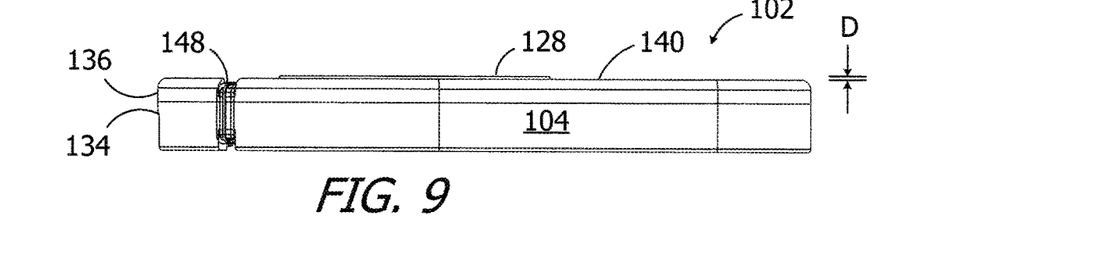
FIG. 9 is a side view of the electronics and antenna assembly illustrated in FIG. 5.
Figure 10:
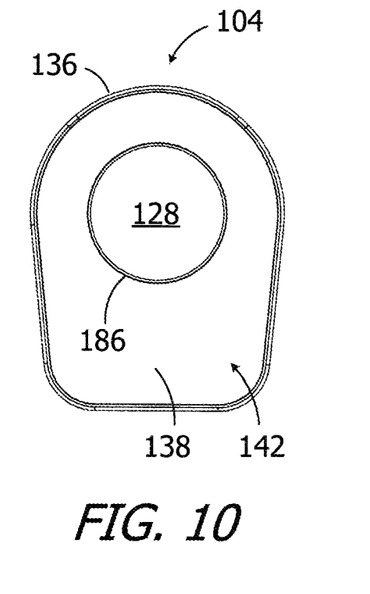
FIG. 10 is a top view of a portion of the electronics and antenna assembly illustrated in FIG. 5.

Turning to FIG. 9, the portion of the electronics case that defines the ground contact 128 in the illustrated implementation projects beyond the end of the case cover side wall 140 (as well as the top surface of the antenna/shield cover 132) by a distance D. The distance D may be equal to the thickness of the overmold case covering portion 122. As a result, the exposed ground contact 128 is flush with the outer surface of the adjacent portion of the overmold 120.

The positioning of the antenna 106 within the annular recess 170 of the electromagnetic shield 130 protects the antenna from impact, as does the antenna/shield cover 132. The impact protection is enhanced by the presence of a portion of the metal electronics case 104 within the openings defined by the antenna 106 and shield 130. This impact protection is especially useful in those instances where the antenna consists of a coil that is printed on a substrate, as this type of antenna can be fragile.

Figure 16:
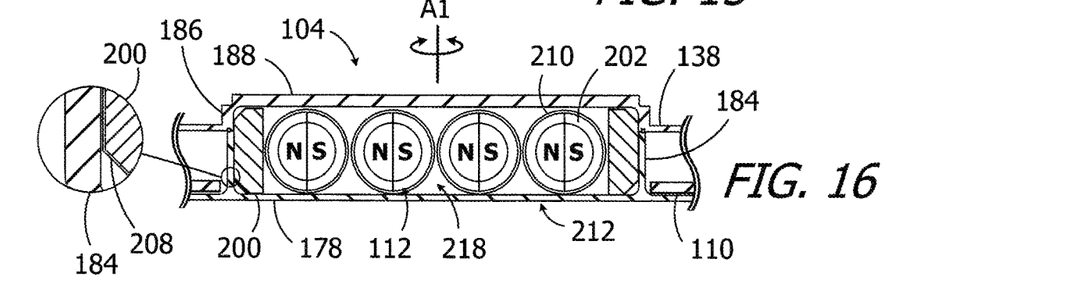
FIG. 16 is a section view taken along line 16-16 in FIG. 5.
Figure 17:
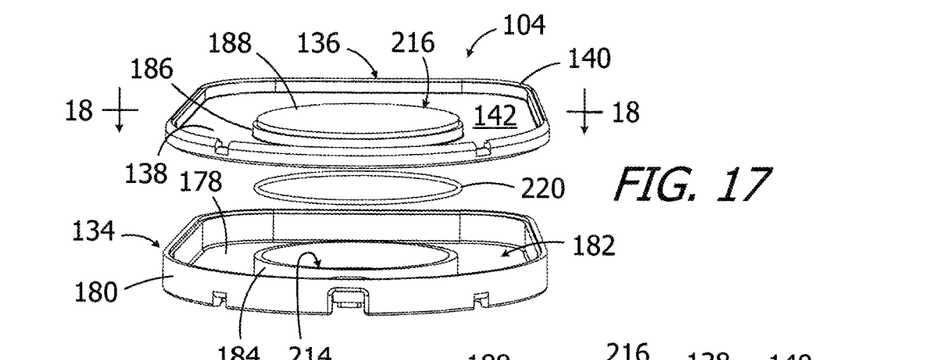
FIG. 17 is an exploded an exploded perspective view of a portion of the electronics and antenna assembly illustrated in FIG. 5.
Figure 18:
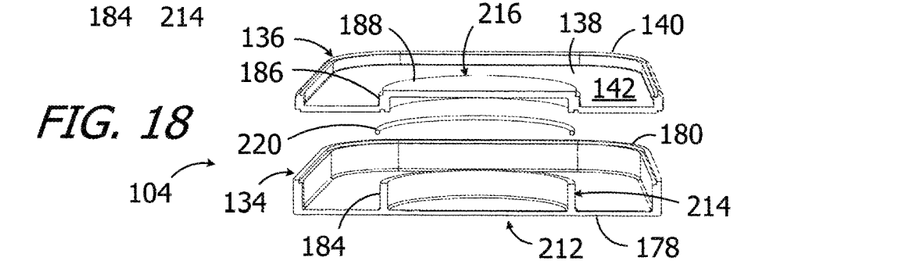
FIG. 18 is a section view taken along line 18-18 in FIG. 17.

As is illustrated for example in FIGS. 10-13, and as noted above, the exemplary electronics case 104 encloses the PCB 110 and the MRI-compatible magnet assembly 112. To that end, the electronics case base 134 includes an end wall 178 and a side wall 180 that define an internal volume 182. The PCB 110 is located within the internal volume. The electronics case base 134 also includes a cylindrical member 184 that, along with a portion of the end wall 178, forms the base part of a magnet case (discussed below with reference to FIGS. 16-18) in which the magnet assembly 112 is located. The electronics case cover 136 includes a cylindrical member 186 and a disc 188 that form the cover part of the magnet case (FIGS. 16-18). The cylindrical members 184 and 186 together define a cylindrical wall of the magnet case. The disc 188 also defines the ground contact 128. The magnet assembly 112 is located within the magnet case and the magnet assembly and the associated case together form an MRI-compatible magnet apparatus.

With respect to the aforementioned access to the feedthroughs 158 in the illustrated implementation, the wall 178 of the case base 134 includes a feedthrough access opening 190 that is aligned with the feedthroughs. A feedthrough cover 192 may be welded or otherwise secured to the wall 178 after the antenna 106 and lead wires have been connected to the feedthroughs 158 in the manner described above.

The exemplary PCB 110 includes a non-conductive substrate 194, with conductive tracks and pads (not shown), and a stimulation processor 196 and various other electronic components (e.g., integrated circuits and electrical connectors) on the substrate. The stimulation processor 196 converts stimulation data received by way of the antenna 106 into stimulation current. The PCB 110 may be configured to accommodate the cylindrical member 184. In the illustrated embodiment, the PCB substrate 194 includes an indentation 198 that allows associated portions of the substrate to extend around the cylindrical member 184 and to the feedthroughs 158. The PCB 110 may be connected to the feedthrough pins 162 (FIG. 8) by, for example, bonding the feedthrough pins 162 to contacts on the PCB 110 with conductive epoxy.

The present EA assemblies 102 may include one or more rotatable magnets within the electronics case 104. The configuration of the magnets, and the manner in which they are carried within the electronics case 104, allows the magnets to rotate into alignment with a dominant magnetic field. One exemplary magnet assembly implementation is described below. This and other examples of rotatable MRI-compatible magnet configurations are described in greater detail, for example, US Pat. Pub. Nos. 2018/0110985, 2018/0369586, 2018/0296826, and 2019/0076649 and PCT Pat. Pub. No. WO2018/199936, which are incorporated herein by reference.

Figures 14, 15:
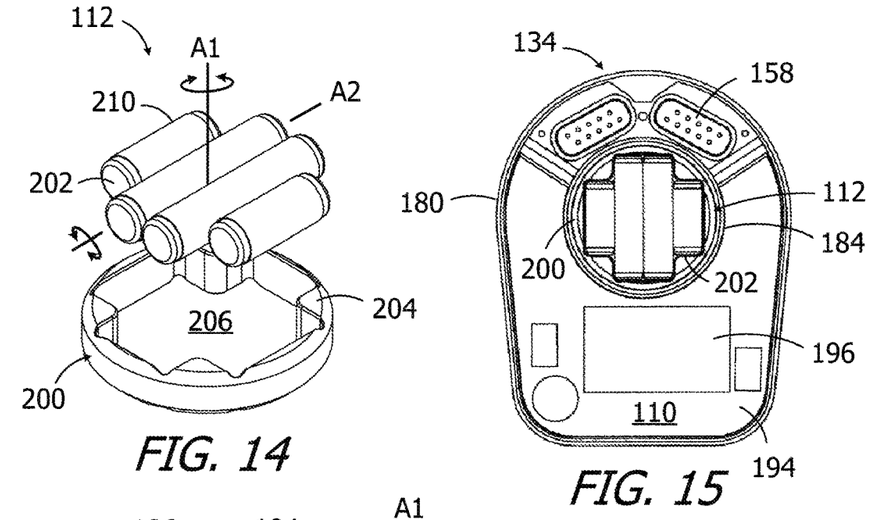
FIG. 14 is an exploded perspective view of a portion of the electronics and antenna assembly illustrated in FIG. 5.
FIG. 15 is a top view of a portion of the electronics and antenna assembly illustrated in FIG. 5.

Turning to FIGS. 14-16, the exemplary magnet assembly 112 includes a magnet frame 200 and a plurality of elongate diametrically magnetized magnets 202 within the frame that define a N-S direction. The exemplary cylindrical members 184 and 186 of the electronics case 104 define a central axis A1, which is also the central axis of the magnet frame 200, and the magnet frame is rotatable relative to the electronics case about the central axis A1 over 360°. The magnets 202 rotate with the magnet frame 200 about the central axis A1. Each magnet 202 is also rotatable relative to the magnet frame 200 about its own longitudinal axis A2 (also referred to as "axis A2") over 360°. In the illustrated implementation, the longitudinal axes A2 are parallel to one another and are perpendicular to the central axis A1. In other implementations, the magnets within a magnet apparatus may be oriented such that the longitudinal axes thereof are at least substantially perpendicular to the central axis A1. As used herein, an axis that is "at least substantially perpendicular to the central axis" includes axes that are perpendicular to the central axis as well as axes that are slightly non-perpendicular to the central axis (i.e., axes that are offset from perpendicular by up to 5 degrees).

The exemplary magnet frame 200 includes a disk 204 and a magnet receptacle 206 that extends completely through the disk. Although the present inventions are not limited to any particular number, there are four elongate diametrically magnetized magnets 202 in the exemplary magnet assembly 112. Two of the otherwise identical magnets 202 are relatively long and two are relatively short in order to efficiently utilize the available volume. The shape of the receptacle 206 corresponds to the overall shape of the group of magnets 202. Suitable materials for the frame 200, which may be formed by machining or injection molding, include paramagnetic metals, polymers and plastics. Suitable materials for the magnets 202 include, but are not limited to, neodymium-boron-iron and samarium-cobalt.

When exposed to a dominant MRI magnetic field, the torque on the magnets 202 will rotate the magnets about their axes A2 as necessary to align the magnetic fields of the magnets with the MRI magnetic field. The magnet frame 200 will also rotate about axis A1 as necessary to align the magnetic fields of the magnets 202 with the MRI magnetic field. When the magnet assembly 112 is removed from the MRI magnetic field, the magnetic attraction between the magnets 202 will cause the magnets to rotate about axis A2 back to the orientation illustrated in FIG. 16, where they are aligned with one another in the N-S direction and the N-S orientation of the magnets is perpendicular to the central axis A1.

To facilitate rotation of the magnet frame 200 and/or the magnets 202, lubricious friction reducing material may be provided between the electronics case 104 and the magnet frame and/or between the magnets and the electronics case and magnet frame. For example, a lubricious layer 208 may be added to all of the various surfaces of the frame 200 (as shown). In other implementations, a lubricious layer may be added to the inner surfaces of the electronics case 104 that are in contact with the magnet assembly 112. The lubricious layer 208 may be in the form of a specific finish of the inner surface that reduces friction, as compared to an unfinished surface, or may be a coating of a lubricious material such as diamond-like carbon (DLC), titanium nitride (TiN), PTFE, polyethylene glycol (PEG), Parylene, fluorinated ethylene propylene (FEP) and electroless nickel sold under the tradenames Nedox® and Nedox PFT™. The DLC coating, for example, may be only 0.5 to 5 microns thick. Alternatively, or in addition, the magnets 202 may be located within tubes 210 formed from low friction material. Suitable materials for the tube 210 include polymers, such as silicone, PEEK and other plastics, PTFE, and PEEK-PTFE blends, and paramagnet metals. The magnets 202 may be secured to the tubes 210 such that the each tube rotates with the associated magnet about its axis A2, or the magnets may be free to rotate relative to the tubes. The magnet/tube combination is also more mechanically robust than a magnet alone. The magnets 202 may, in place of the tube 210, be coated with the lubricious materials discussed above.

Referring now to FIGS. 16-18, and as alluded to above, various portions of the electronics case 104 combine to form a magnet case 212 in which the magnet assembly 112 is located, thereby storing the magnet assembly within the electronics case internal volume 182 in a manner that isolates the magnet assembly from the electronics within the internal volume. The exemplary magnet case 212 has a base part 214 formed from the cylindrical member 184 and the portion of the end wall 178 bounded the cylindrical member 184, and a cover part 216 formed from the cylindrical member 186 and disc 188. The base and cover parts 214 and 216 together define an internal volume 218 for the magnet assembly 112 that is sealed with an o-ring seal 220 or other suitable instrumentality. The seal prevents contaminants associated with the rotating portions of the magnet assembly 112 from entering portion of the electronics case internal volume 182 where the PCB 110 is located.

It should also be noted that, in the illustrated implementation, the magnet assembly 112 is permanently secured within the electronics case 104. As used herein, a magnet assembly is "permanently secured within an electronics case" when, once the electronics case is welded or otherwise sealed shut with the electronic components and magnet assembly therein, the magnet assembly cannot be removed from the electronics case without destruction of a least a portion of the case (e.g., the case base and/or case cover) and/or the weld or other instrumentality that seals the case.

Figure 19:
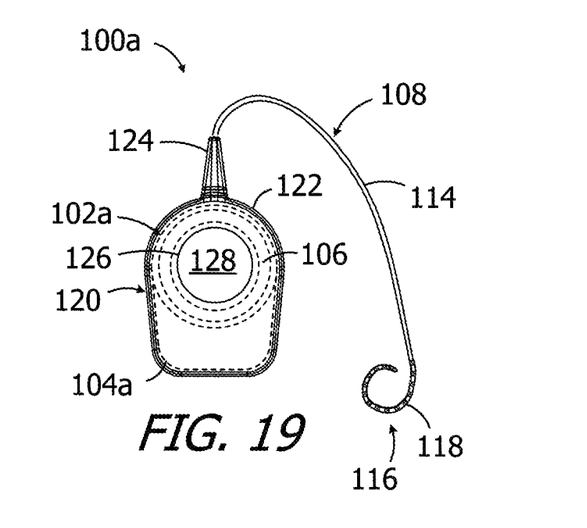
FIG. 19 is a top view of an exemplary implantable cochlear stimulator in accordance with one embodiment of a present invention.
Figure 20:
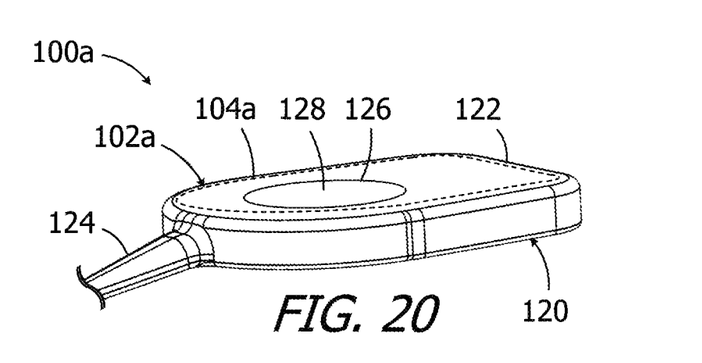
FIG. 20 is a perspective view of a portion of the implantable cochlear stimulator illustrated in FIG. 19.

Another exemplary cochlear implant is generally represented by reference numeral 100a in FIGS. 19 and 20. The cochlear implant 100a is substantially similar to cochlear implant 100 and similar elements are represented by similar reference numerals. For example, the cochlear implant 100a includes an electronics and antenna assembly ("EA assembly") 102a, with an electronics case 104a and an antenna 106 mounted to the top of the electronics case, and a cochlear lead 108. The antenna 102 and lead wires may be connected to a PCB within the electronics case 104a in the manner described above. An MRI-compatible magnet assembly, such as the magnet assembly 112, may be housed within the electronics case in the manner described above. Additionally, the top, bottom and sides of the EA assembly 102a may be covered with an overmold 120 that includes a case covering portion 122 and a strain relief 124, and a portion of the electronics case 104a is exposed through an opening 126 in the overmold to define a ground contact 128.

Figure 21:
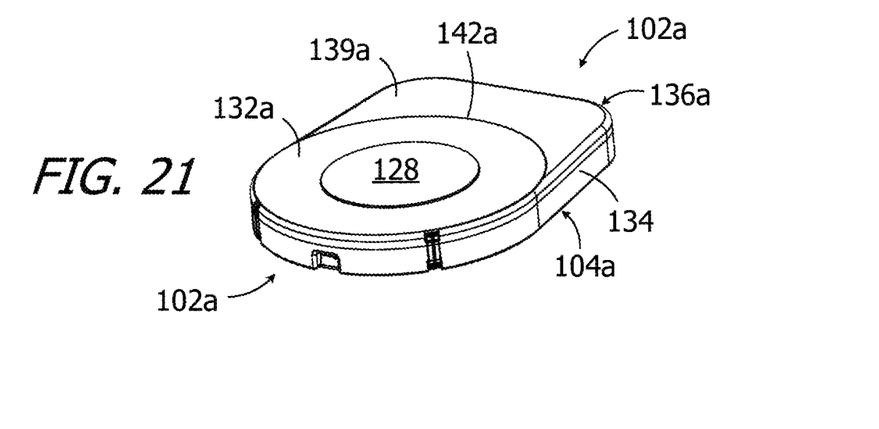
FIG. 21 is a perspective view of an electronics and antenna assembly in accordance with one embodiment of a present invention.
Figure 22:
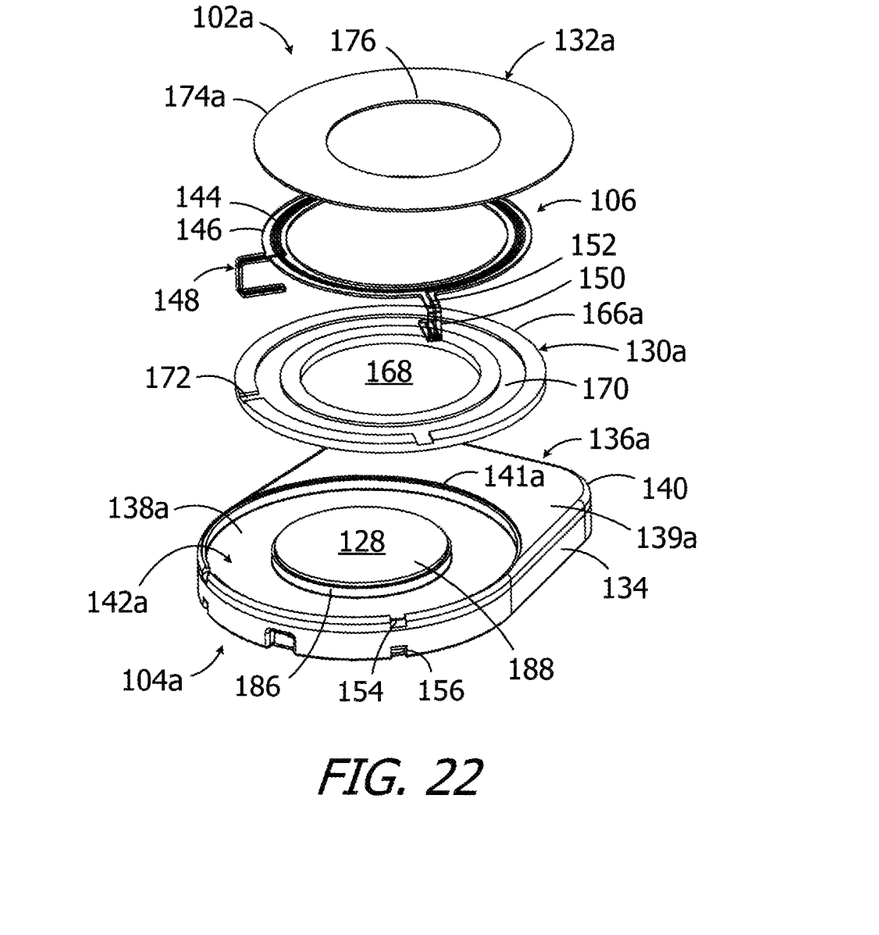
FIG. 22 is a partially exploded perspective view of the electronics and antenna assembly illustrated in FIG. 21.

Turning to FIGS. 21 and 22, the exemplary EA assembly 102a also includes annularly-shaped electromagnetic shield 130a between the electronics case 104a and the antenna 106, as well as a circular antenna/shield cover 132a over the antenna and the electromagnetic shield. The exemplary electronics case 104a includes the above-described case base 134 and a case cover 136a, which enclose the PCB 110 and MRI-compatible magnet assembly 112 and may be secured to one another in in the manner described above. The case cover 136a is configured to receive the electromagnetic shield 130a, the antenna 106 and the antenna/shield cover 132a. In particular, the case cover 136a includes an annular indentation (or "external volume") 142a that is sized and shaped to receive the electromagnetic shield 130a, the antenna 106 and the antenna/shield cover 132a. The indentation 142a is defined by an annular end wall 138a, a portion of a side wall 140, a semi-circular wall 141a and the cylindrical member 186. A second end wall 139a occupies the region between the semi-circular wall 141a and the side wall 140.

The exemplary electromagnetic shield 130a, which may be formed from a high magnetic permeability material such as that described above, includes an annular plate 166a that is configured (i.e., sized and shaped) to fit into the indentation 142a and an opening 168 for the cylindrical member 186. An annular recess 170 is provided for the antenna coil 144 and substrate 146, while openings 172 are provided for the antenna tabs 148 and are aligned with the openings 154 and 156.

The exemplary antenna/shield cover 132a has a configuration corresponding to that of the electromagnetic shield 130a and, accordingly, includes a circular plate 174a that is also configured to fit into the indentation 142a and over the antenna 106 and the electromagnetic shield 130a. An opening 176 extends through the plate 174 to accommodate the cylindrical member 186. Here too, the antenna/shield cover 132a protects antenna 106 and the electromagnetic shield 130a and seals the non-biocompatible electromagnetic shield within the EA assembly 102a. Suitable materials for the cover 132a include PEEK or other suitable high strength materials.

Figure 23:
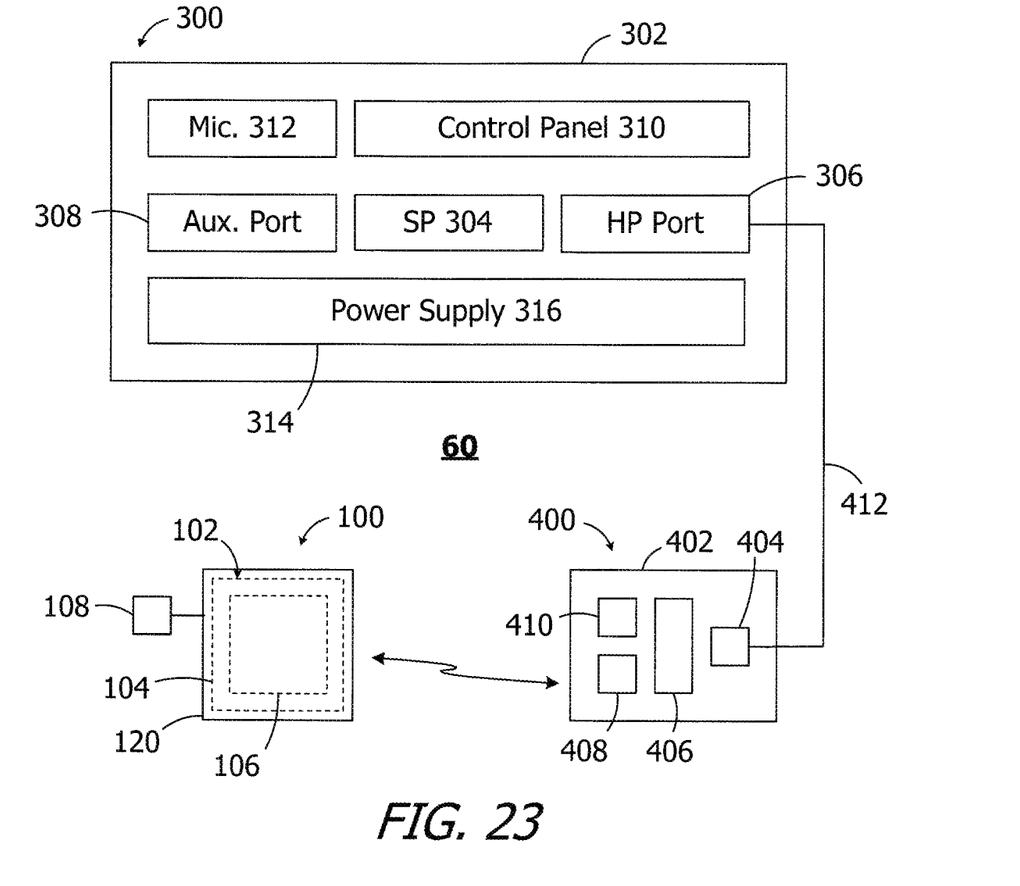
FIG. 23 is a diagrammatic view of an exemplary ICS system.

Turning to FIG. 23, the exemplary cochlear implant system 60 includes the cochlear implant 100, a sound processor, such as the illustrated body worn sound processor 300 or a behind-the-ear sound processor, and a headpiece 400.

The exemplary body worn sound processor 300 in the exemplary ICS system 60 includes a housing 302 in which and/or on which various components are supported. Such components may include, but are not limited to, sound processor circuitry 304, a headpiece port 306, an auxiliary device port 308 for an auxiliary device such as a mobile phone or a music player, a control panel 310, one or more microphones 312, and a power supply receptacle 314 for a removable battery or other removable power supply 316 (e.g., rechargeable and disposable batteries or other electrochemical cells). The sound processor circuitry 304 converts electrical signals from the microphone 312 into stimulation data. The exemplary headpiece 400 includes a housing 402 and various components, e.g., a RF connector 404, a microphone 406, an antenna (or other transmitter) 408 and a positioning magnet 410, that are carried by the housing. The headpiece 400 may be connected to the sound processor headpiece port 306 by a cable 412. The positioning magnet 410 is attracted to the magnet assembly 112 of the cochlear stimulator 100, thereby aligning the antenna 408 with the antenna 106. The stimulation data and, in many instances power, is supplied to the headpiece 400. The headpiece 400 transcutaneously transmits the stimulation data, and in many instances power, to the cochlear implant 100 by way of a wireless link between the antennas. The stimulation processor 196 converts the stimulation data into stimulation signals that stimulate the contacts 118 of the electrode array 116 (FIG. 2) on the lead 108.

In at least some implementations, the cable 412 will be configured for forward telemetry and power signals at 49 MHz and back telemetry signals at 10.7 MHz. It should be noted that, in other implementations, communication between a sound processor and a headpiece and/or auxiliary device may be accomplished through wireless communication techniques. Additionally, given the presence of the microphone(s) 312 on the sound processor 300, the microphone 406 may be also be omitted in some instances. The functionality of the sound processor 300 and headpiece 400 may also be combined into a single head wearable sound processor. Examples of head wearable sound processors are illustrated and described in U.S. Pat. Nos. 8,811,643 and 8,983,102, which are incorporated herein by reference in their entirety.

Although the inventions disclosed herein have been described in terms of the preferred embodiments above, numerous modifications and/or additions to the above-described preferred embodiments would be readily apparent to one skilled in the art. By way of example, the inventions also include any combination of the elements from the various species and embodiments disclosed in the specification that are not already described. It is intended that the scope of the present inventions extend to all such modifications and/or additions and that the scope of the present inventions is limited solely by the claims set forth below.

We claim:

1. An electronics and antenna assembly for use in a medical implant, the electronics and antenna assembly comprising:
a metal electronics case having a length, a width and a thickness that is less than the length and the width, and including first and second end walls and a side wall that defines the thickness, an internal volume, and an external recess with a closed bottom end defined entirely by the first end wall and a perimeter defined at least partially by the side wall;
electronic components within the internal volume;
an antenna/shield cover within the external recess and formed from a first material;
an antenna coil within the external recess and between the end wall and the antenna/shield cover; and
an electromagnetic shield within the external recess between the antenna coil and the end wall, formed from a second material that is different than the first material and that has a magnetic permeability of about 25 to about 250, and defining an annular shield recess in which the antenna coil is located.

2. An electronics and antenna assembly as claimed in claim 1, wherein
the metal electronics case comprises a titanium electronics case.

3. An electronics and antenna assembly as claimed in claim 1, wherein
the electromagnetic shield is about 0.1 mm to about 1.5 mm thick.

4. An electronics and antenna assembly as claimed in claim 1, wherein
the electronic components within the internal volume include a cochlear implant stimulation processor.

5. A cochlear implant, comprising:
the electronics and antenna assembly claimed in claim 4; and
a cochlear lead with an electrode array operably connected to the cochlear implant stimulation processor.

6. An electronics and antenna assembly as claimed in claim 1, wherein
the antenna/shield cover is formed from an electrically non-conductive high-strength material.

7. An electronics and antenna assembly as claimed in claim 1, wherein
the electromagnetic shield is formed from a soft ferrite.

8. An electronics and antenna assembly for use in a medical implant, the electronics and antenna assembly comprising:
a metal electronics case having an internal volume, an end wall and an external recess adjacent to the end wall;
electronic components within the internal volume;
an antenna within the external recess; and
an electromagnetic shield within the external recess between the antenna and the end wall;
wherein
the antenna includes an annular non-conductive substrate that defines an opening and a coil on the substrate;
the metal electronics case includes a magnet case;
at least one rotatable magnet is located within the magnet case; and
a portion of the magnet case extends through the opening in the non-conductive substrate.

9. An electronics and antenna assembly as claimed in claim 8, wherein
the at least one rotatable magnet is permanently secured within the metal electronics case.

10. An electronics and antenna assembly as claimed in claim 8, wherein
the magnet case defines a central axis; and
the at least one rotatable magnet comprises a plurality of elongate diametrically magnetized magnets that are located in a magnet frame, the magnet frame is rotatable about the central axis of the case, and the elongate diametrically magnetized magnets define a longitudinal axis and a N-S direction and are rotatable about the longitudinal axis relative to the magnet frame.

11. An electronics and antenna assembly as claimed in claim 8, wherein
an elastomer covers a portion of the metal electronics case, antenna and shield;
the metal electronics case, antenna, shield and elastomer together occupy a first volume;
the magnet case includes an interior that defines a second volume; and
the ratio of the first volume to the second volume is less than or equal to 9.7.

12. An electronics and antenna assembly as claimed in claim 11, wherein
the ratio of the first volume to the second volume is less than or equal to 9.7 and is greater than or equal to 6.1.

13. An electronics and antenna assembly as claimed in claim 8, wherein
an antenna/shield cover within the external recess;
wherein the antenna and the electromagnetic shield are between the end wall and the antenna/shield cover.

14. An electronics and antenna assembly as claimed in claim 8, wherein
the electromagnetic shield includes a recess and the antenna is located within the electromagnetic shield recess.

15. An electronics and antenna assembly as claimed in claim 8, wherein
the electromagnetic shield is formed from a material with a high magnetic permeability.

16. An electronics and antenna assembly as claimed in claim 8, wherein
the electronic components within the internal volume include a cochlear implant stimulation processor.

17. A cochlear implant, comprising:
the electronics and antenna assembly claimed in claim 16; and
a cochlear lead with an electrode array operably connected to the cochlear implant stimulation processor.

* * * * *